United States Patent

Hester

[15] 3,672,457

[45] June 27, 1972

[54] DEVICES FOR WEIGHING SMALL OBJECTS

[72] Inventor: Benny Lee Hester, Winston-Salem, N.C.

[73] Assignee: R. J. Reynolds Tobacco Company, Winston-Salem, N.C.

[22] Filed: June 24, 1971

[21] Appl. No.: 156,177

[52] U.S. Cl. .................................. 177/201, 177/1, 177/207
[51] Int. Cl. ........................................................ G01g 5/04
[58] Field of Search ........................... 177/1, 201, 207–209, 177/212

[56] References Cited

UNITED STATES PATENTS

| 751,295 | 2/1904 | Jones | 177/201 X |
| 751,296 | 2/1904 | Jones | 177/201 X |
| 2,773,685 | 12/1956 | Aagaard | 177/212 X |

*Primary Examiner*—Robert S. Ward, Jr.
*Attorney*—Stepno & Neilan

[57] ABSTRACT

Device for rapidly determining the weight of light weight objects comprising a tubular member having a vertical duct therethrough for the passage of air. The duct is open at the top of the member and connected to means for supplying air for passage through the duct and out through the top of said member. Connected to the top of the member is a platform restricted in its lateral movement and adapted to be moved vertically to a predetermined point above said member to allow air from the duct in said member to exit beneath the platform, which platform is thereby suspended by the pressure of the exiting air. A calibrated pressure gauge is associated with the air supply means which registers the difference in pressure in the air supply means when an object to be weighed is placed on the platform and depresses the platform. The weighing device is particularly suited for rapid quality control procedures in the manufacture of light weight objects, such as cigarettes.

5 Claims, 1 Drawing Figure

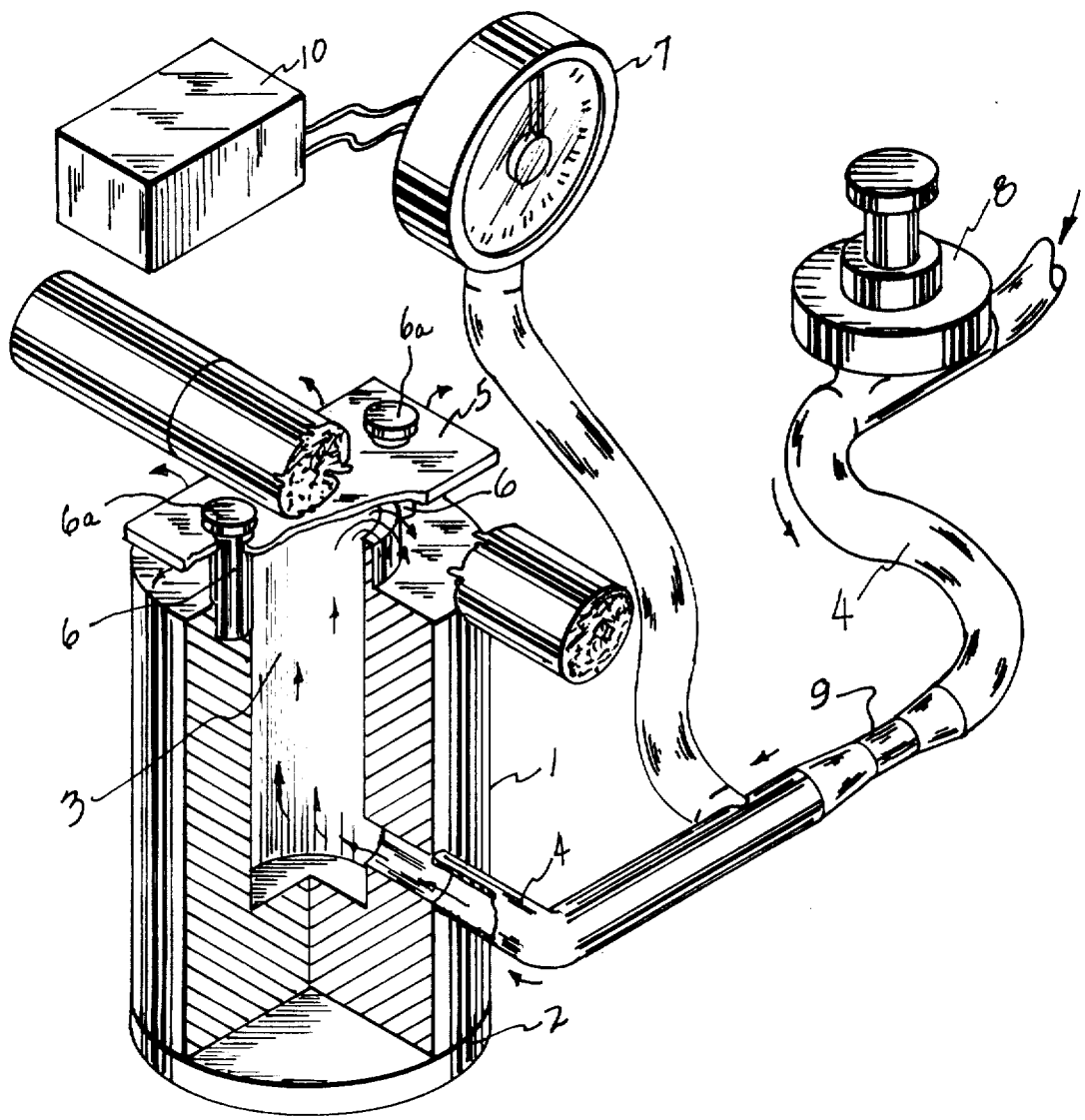

3,672,457

DEVICES FOR WEIGHING SMALL OBJECTS

BACKGROUND OF THE INVENTION

This invention relates to weighing devices. More particularly, this invention relates to devices especially adapted for rapidly weighing small, light objects.

The quality control of consumer products is a recognized necessity in nearly all manufacturing operations which produce such products. As a consequence, many manufacturers have installed quality control procedures which are carried out in association with their manufacturing processes. In many manufacturing processes, these quality control procedures are very rigid both for the protection of the consumer and the benefit of the manufacturer.

In manufacturing processes wherein small objects are the product, such as cigarettes, pharmaceutical dosage tablets, small metallic or plastic objects, and the like, at least one of the steps necessary for the quality control of the objects being produced is a determination of the weight of the individual objects. This is a very tedious and time consuming operation. Due to the fact that the objects produced weigh so little, e.g., a cigarette weighs about 1 gram or less, it is extremely difficult to obtain accurate weight measurements in a short period of time. As a result, either the quality control operator expends a large amount of time in accurately determining the weight of the objects being produced for providing rigid quality control, or the objects are weighed in a short period of time, but inaccurately, which reduces the quality control standards of the operation.

Methods have been devised in an attempt to overcome the above mentioned difficulties in obtaining a rigid quality control in the manufacture of small objects. However, these methods have not proved entirely satisfactory due to either the time consumption required or the degree of error in the weight measurement.

SUMMARY OF THE INVENTION

Accordingly, it is an object of this invention to provide a device for accurately determining the weight of small, light weight objects.

It is a further object of this invention to provide a device which accurately determines the weight of small objects in a very short period of time.

It is a still further object of this invention to provide a weighing device which is simple in operation and efficient in results and which is especially suited for the weighing of small objects.

Briefly, in accordance with this invention, there is provided a weighing device which is composed of a tubular member having a vertical duct extending therethrough which allows for the passage of air through the member. The duct is open at the top of said member and is connected to means for supplying air for passage through the duct out through the top of said member. A platform is connected to the top of the member and is adapted to be suspended above the top of said member by the pressure of air passing through said duct and out through the top of said member. Preferably, the platform is connected to the member by pins which restrain its lateral movement and also its vertical movement to a predetermined point a slight distance above the member. There is further provided means, e.g., a calibrated pressure gauge, connected to the air supply means for determining the difference in the pressure within the air supply means when an object to be weighed is placed on the platform causing it to fall which results in a back pressure build up in the air supply line.

BRIEF DESCRIPTION OF THE DRAWING

In the drawing:

The FIGURE is a perspective view partly in section of the weighing device of this invention.

DETAILED DESCRIPTION OF THE INVENTION

The invention will be more fully understood with reference to the accompanying drawings wherein like numerals indicate like parts.

In the drawing, a tubular member 1, supported by a base 2, has located therein a vertical duct 3 for the passage of air therethrough. Air, from a source not shown, passes through a supply line 4 into the vertical duct 3 and out through the top of the member 1. The passage of air through the duct 3 causes a platform 5 to rise in order to permit the exit of the air to the atmosphere. The platform 5 is connected to the top of member 1 by restraining pins 6 which restrict platform 5 in its lateral movement. Preferably restraining pins 6 terminate in pin heads 6a which serve to prevent platform 5 from being disconnected from member 1 in the event that the pressure through duct 3 becomes excessive. The distance from the top of member 1 to the pin heads 6a may vary depending upon the type and variety of objects to be weighed. Restraining pins 6 pass through openings in platform 5, and while the pin heads 6a are larger than the openings in the platform, the pins themselves should be of a substantially smaller diameter than the openings in platform 5 so as to permit free, frictionless vertical movement of platform 5 on the restraining pins.

The air supply line 4 is preferably provided with a pressure regulator 8 for the regulation of the pressure through the line into duct 3. A pressure gauge 7 is also provided in association with line 4 for determining the pressure of the air passing therethrough. It should be understood that while a pressure gauge is illustrated in the drawing, any other suitable means may be used to detect the difference in pressure in line 4. When a gauge is used, it is preferably calibrated to provide a reading in the desired units. For example, when the device is used to weigh a cigarette, the gauge could be calibrated to provide a signal when the weight of the object varied, for example, plus or minus 5 percent, from 1 gram.

It will be appreciated that since the device of this invention is to be used for weighing small objects of the character described above, the entire device operates under very low flow rate conditions. That is, the flow rate of the air passing through the supply line 4 into the duct 3 is extremely low in comparison to other devices which operate with the use of pressurized fluids, such as air. As a consequence, the supply line 4 is preferably provided with a flow rate metering orifice 9.

While there are shown two restraining pins 6, it should be understood that the number of restraining pins required will be dependent upon the shape of the platform and the shape of the tubular member. The critical factors in relation to the restraining pins are, as mentioned above, that the platform be allowed to freely float between the top of the member 1 and the pin heads 6a, and also, that the platform remain substantially horizontal during use. Again, while the shape of tubular member 1 is illustrated as being cylindrical, this is not a critical feature of this invention, and any desired shape may be used.

In operation of the device of this invention, air, from a source not shown, is passed into air supply line 4 and through pressure regulator 8 which is adjusted to provide the desired air pressure. The air passes from regulator 8 through line 4, past orifice 9 and gauge 7 into duct 3 and out of the top of member 1. This causes the platform 5 to rise and in effect ride on the film of the air escaping from the duct 3. When properly positioned, the air will escape from duct 3 into the atmosphere around the entire perimeter of platform 5. The air pressure required to hold the platform in its desired position is recorded on the pressure gauge 7. The object to be weighed, e.g., a cigarette, is placed on the platform 5 which causes the same to fall thereby reducing the clearance or exit area for the air exiting from duct 3. This in turn causes the pressure in duct 3 and line 4 to increase to an amount sufficient to support the platform with the object. The back pressure build up in line 4 is immediately recorded on the pressure gauge 7 and the weight of the object thereby determined. Conveniently, pressure gauge 7 may be additionally connected to signal means 10 which indicates to the operator that the object being weighed is beyond the acceptable deviation from the normal or desired weight thereof.

Thus, the weighing device of the instant invention provides an efficient method for weighing small, light weight objects and is simple to operate. A further advantage of the device described above is the fact that the device has an extremely fast response time; that is the weight of the object being placed on the platform is generally determined in a period of time between 5 and 10 milliseconds, never more than 0.5 second. Furthermore, due to the nature of the operation of the device described, there is very little, if any, possibility of overshoot; that is, the weight indicated on the pressure gauge or other like device will very rarely, if ever, exceed the exact weight of the object placed on the floating platform.

As many apparently widely different embodiments of this invention may be made without departing from the spirit and scope thereof, it is to be understood that same is not to be limited to the specific embodiments thereof except as claimed in the appended claims.

What is claimed is:

1. A weighing device comprising a tubular member having a vertical duct therein adapted for the passage of air, said duct being opened at the top of said member, air supply means connected to said duct, a platform connected to the top of said member and adapted to be suspended above the top of said member by air passing through said duct, and means connected to said air supply means for determining the difference in pressure therein when an object to be weighed is placed on said platform.

2. The weighing device as described in claim 1, wherein the means for determining the pressure difference is a pressure gauge.

3. A weighing device as described in claim 2, wherein the pressure gauge is calibrated to determine the weight of an object placed on said platform.

4. A weighing device as described in claim 1, wherein said platform is connected to the top of said member by restraining pins.

5. A weighing device as described in claim 4, wherein said platform is adapted to allow air exiting from said vertical duct to escape into the atmosphere around the entire perimeter of said platform.

* * * * *